(12) United States Patent
Jensen

(10) Patent No.: US 6,616,835 B2
(45) Date of Patent: Sep. 9, 2003

(54) COOLANT RECYCLING SYSTEM

(76) Inventor: Jon A. Jensen, 31307 - 144th St., Princeton, MN (US) 55371

( * ) Notice: Subject to any disclaimer, the term of this patent is extended or adjusted under 35 U.S.C. 154(b) by 0 days.

(21) Appl. No.: 09/962,513

(22) Filed: Sep. 24, 2001

(65) Prior Publication Data

US 2003/0057145 A1 Mar. 27, 2003

(51) Int. Cl.[7] .............................. B01D 29/00; B23H 7/36
(52) U.S. Cl. ..................... 210/167; 210/86; 210/124; 210/136; 210/195.1; 210/192; 210/206; 210/242.1; 210/258; 210/260
(58) Field of Search .................................. 210/167, 168, 210/171, 172, 195.1, 251, 192, 206, 258, 260, 242.1, 242.3, 257.1, 136, 86, 121, 124, 295, 339, 760, 776, 805

(56) References Cited

U.S. PATENT DOCUMENTS

| | | | |
|---|---|---|---|
| 3,685,656 A | * | 8/1972 | Schaefer |
| 3,867,288 A | * | 2/1975 | Schaefer |
| 4,132,645 A | * | 1/1979 | Bottomley et al. .......... 210/104 |
| 4,872,997 A | * | 10/1989 | Becker |
| 5,104,529 A | | 4/1992 | Becker ..................... 210/195.1 |
| 5,948,274 A | * | 9/1999 | Lyon et al. |
| 6,322,694 B1 | * | 11/2001 | Iliadis et al. |

* cited by examiner

Primary Examiner—Joseph Drodge
Assistant Examiner—Terry K. Cecil

(57) ABSTRACT

A coolant recycling system for efficiently recycling contaminated machine tool coolant thereby extending the useful life of the coolant. The coolant recycling system includes a support frame, a first tank for receiving contaminated coolant, a second tank for receiving a volume of water and coolant concentrate, and a third tank for treating and cleaning the contaminated coolant. A skimmer apparatus is positioned within the third tank for removing the upper level of contaminants from the coolant for filtering separately from the significant volume of coolant within the third tank. An ozone applicator applies a specific volume of ozone to the coolant during the mixing of the coolant within the third tank which kills mold, yeast, fungus and bacteria while also changing the physical state of dissolved solids for increasing the ability to remove the contaminants from the coolant and micro air bubbles float contaminants to the surface to be skimmed.

16 Claims, 10 Drawing Sheets

COOLANT RECYCLING SYSTEM

BACKGROUND OF THE INVENTION

1. Field of the Invention

The present invention relates generally to fluid recycling systems and more specifically it relates to a coolant recycling system for efficiently recycling contaminated machine tool coolant thereby extending the useful life of the coolant.

Machine tool devices often times utilize a liquid coolant to maintain a desirable temperature for components of the machine tool and the parts they are working upon. The liquid coolant may be comprised of various solutions (water miscible, semi-synthetic, full synthetic, etc.) that are well known in the industry. During the utilizing of the liquid coolant in conjunction with a machine tool, the liquid coolant becomes contaminated with solid contaminants such as metal chips and also with other fluids such as hydraulic fluid and the like (often referred to as "tramp oil"). Furthermore, bacteria, mold, yeast and fungus can increase the degradation of the coolants if not removed. There is a need for a coolant recycling system that effectively removes both the solid and liquid contaminants from machine tool coolant.

2. Description of the Prior Art

Fluid recycling systems have been in use for years. Conventional fluid recycling systems rely mainly upon filters that remove debris that is unable to fit through a specific size of filter often times measured in microns (e.g. 50 micron filter, etc.). However, conventional fluid recycling systems are not as suitable for removing solid fines, tramp oil, and bio-infection created during the operation of a machine tool.

U.S. Pat. No. 5,104,529 issued to Becker illustrates a coolant recycler having a pair of tanks attached to a cart structure that utilizes a plurality of conventional filter structures to filter out the solid fines and tramp oil from the used machine tool coolant. Becker relies mainly upon a "stack" of oil absorbent pads which remove tramp oil (i.e. liquid contaminants) as the coolant flows downwardly into the second tank from the first tank. Unfortunately, it is the applicant's experience that tramp oils will often times simply be forced through these oil absorbent pads and therefore not fully removed from the coolants. Another problem with Becker is that the entire volume of coolant is forced through the oil absorbent pads in large quantities. Another problem with Becker is that it relies on output only mixing since there are no recirculating capabilities within Becker.

While the prior art systems may be suitable for the particular purpose to which they address, they are not as suitable for efficiently recycling contaminated machine tool coolant thereby extending the useful life of the coolant.

In these respects, the coolant recycling system according to the present invention substantially departs from the conventional concepts and designs of the prior art, and in so doing provides an apparatus primarily developed for the purpose of efficiently recycling contaminated machine tool coolant thereby extending the useful life of the coolant.

SUMMARY OF THE INVENTION

In view of the foregoing disadvantages inherent in the known types of recycling systems now present in the prior art, the present invention provides a new coolant recycling system construction wherein the same can be utilized for efficiently recycling contaminated machine tool coolant thereby extending the useful life of the coolant.

The general purpose of the present invention, which will be described subsequently in greater detail, is to provide a new coolant recycling system that has many of the advantages of the recycling systems mentioned heretofore and many novel features that result in a new coolant recycling system which is not anticipated, rendered obvious, suggested, or even implied by any of the prior art recycling systems, either alone or in any combination thereof.

To attain this, the present invention generally comprises a support frame, a first tank for receiving contaminated coolant, a second tank for receiving a volume of water to be mixed or used with cleanser in the machine tool sump and coolant concentrate, and a third tank for treating and cleaning the contaminated coolant. A skimmer apparatus is positioned within the third tank for removing the upper level of contaminants from the coolant for filtering separately from the significant volume of coolant within the third tank. An ozone applicator applies a specific volume of ozone to the coolant during the mixing of the coolant within the third tank which kills mold, yeast, fungus and bacteria while also changing the physical state of dissolved solids for increasing the ability to remove the contaminants from the coolant. In addition, the fine particulate metals are encouraged to the upper portion to be skimmed.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a coolant recycling system that will overcome the shortcomings of the prior art devices.

A second object is to provide a coolant recycling system for efficiently recycling contaminated machine tool coolant thereby extending the useful life of the coolant.

Another object is to provide a coolant recycling system that may be utilized for on recycling of machine tool coolant.

An additional object is to provide a coolant recycling system that removes solids, dissolved solids, fines, tramp oil, bacteria, molds, yeast and fungus from machine tool coolant.

A further object is; to provide a coolant recycling system that efficiently skims contaminated froth from the coolant to efficiently utilize filters without forcing the entire volume of coolant through the filters.

Another object is to provide a coolant recycling system that utilizes ozone to kill mold, yeast, fungus and bacteria contaminants.

A further object is to provide a coolant recycling system that utilizes ozone to change the physical state of some dissolved solids such as iron into rust.

Another object is to provide a coolant recycling system that reduces the need to replace conventional filters.

Another object is to provide a coolant recycling system that is multipurpose which may be utilized within a variety of situations and existing coolant recycling, handling and managing systems.

A further object is to provide a coolant recycling system that is easy and simple to utilize.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
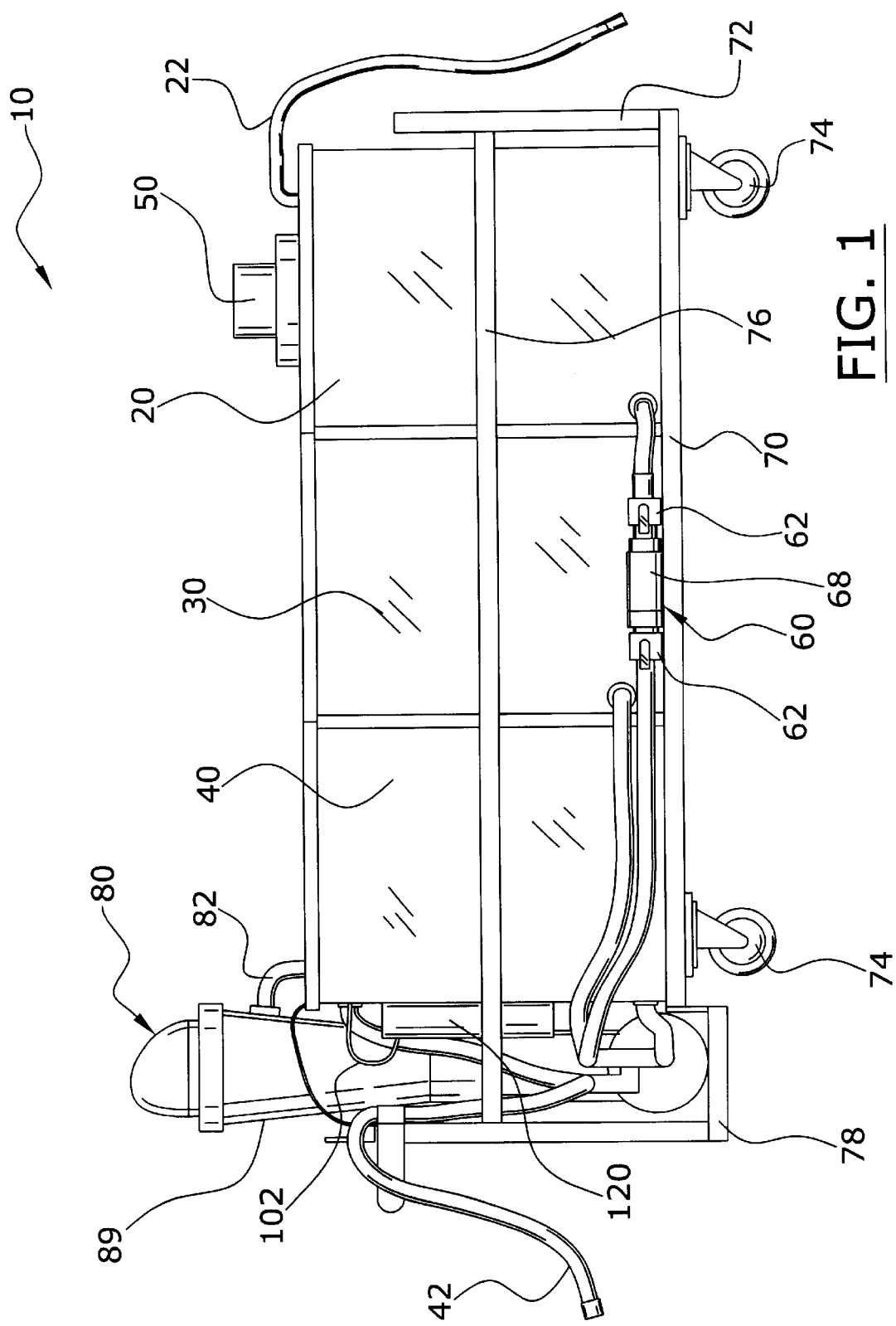
FIG. 1 is a side view of the present invention.

Turning now descriptively to the drawings, in which similar reference characters denote similar elements throughout the several views, FIGS. 1 through 9 illustrate a coolant recycling system 10, which comprises a support frame 70, a first tank 20 for receiving contaminated coolant, a second tank 30 for receiving a volume of water for use with cleaner and recharging solution, and a third tank 40 for treating and cleaning the contaminated coolant. A skimmer apparatus 90 is positioned within the third tank 40 for removing the upper level of contaminants from the coolant for filtering separately from the significant volume of coolant within the third tank 40. An ozone applicator 100 applies a specific volume of ozone to the coolant during the circulation and mixing of the coolant within the third tank 40 which kills mold, yeast, fungus and bacteria while also changing the physical state of some dissolved solids for increasing the ability to remove the contaminants from the coolant. As a result of the pressurized downward emission, the fine particulate particles float to the upper surface and the tramp oils are broken loose that are trapped within the emulsion.

It can be appreciated that the present invention may be embodied within various physical structures to accomplish a similar functionality. The drawings are merely illustrative of an exemplary system and are deemed to be exhaustive of all the possible arrangements of the system.

As shown in FIG. 1 of the drawings, the frame 70 is comprised of a broad structure for supporting the tanks 20, 30, 40. The frame 70 preferably includes a plurality of vertical members 72 attached to a plurality of horizontal members 76 positioned upon wheels 74 along with an extended portion 78 for allowing relocation of the system. However, it can be appreciated that various other physical structures may be utilized to construct the frame 70 and the present drawings should not limit the disclosure of the present invention.

As further shown in FIG. 1 of the drawings, the first tank 20, the second tank 30 and the third tank 40 are positioned upon the frame 70. The tanks 20, 30, 40 may be comprised of individual tanks or comprised of one solid tank structure. In addition, less or more tanks may be utilized to construct the present invention as needed. Furthermore, each of the individual tanks 20, 30, 40 may include sub-tanks within for storing additional chemicals and additives that may be required during the recycling procedure. Also, the shape and sizes of the tanks 20, 30, 40 may vary depending upon the needs of the user. Each of the tanks 20, 30, 40 preferably has a removable cover for allowing direct access to the interior portion of the tanks 20, 30, 40.

FIG. 1 illustrates the usage of a first vacuum 50 attached to the first tank 20 for creating a vacuum within the first tank 20 that allows for the drawing of the contaminated coolant into the first tank 20 from the inlet hose 22. It can be appreciated that various other devices such as pumps may be utilized to draw the contaminated coolant into the first tank 20 which will not be discussed further. The inlet hose 22 may be attached to various existing structures and recycling systems as can be appreciated.

The first tank 20 preferably includes a $1^{st}$ stage basket 23 and $2^{nd}$ state perforated basket 24 or similar structure that filters the larger solids from the contaminated coolant during the initial entry into the first tank 20. A filter bag 27 comprised of a plastic mesh structure preferably surrounds the perforated basket 24 for filtering out finer solid particles that pass through the perforated basket 23, 24 wherein a bag support 26 is utilized within the first tank 20 to support the lower portion of the filter bag 27. The perforated basket 23, 24 and the filter bag 27 are all there preferably removably positioned within the first tank 20 for allowing cleaning or replacement of the same.

Figure 8:
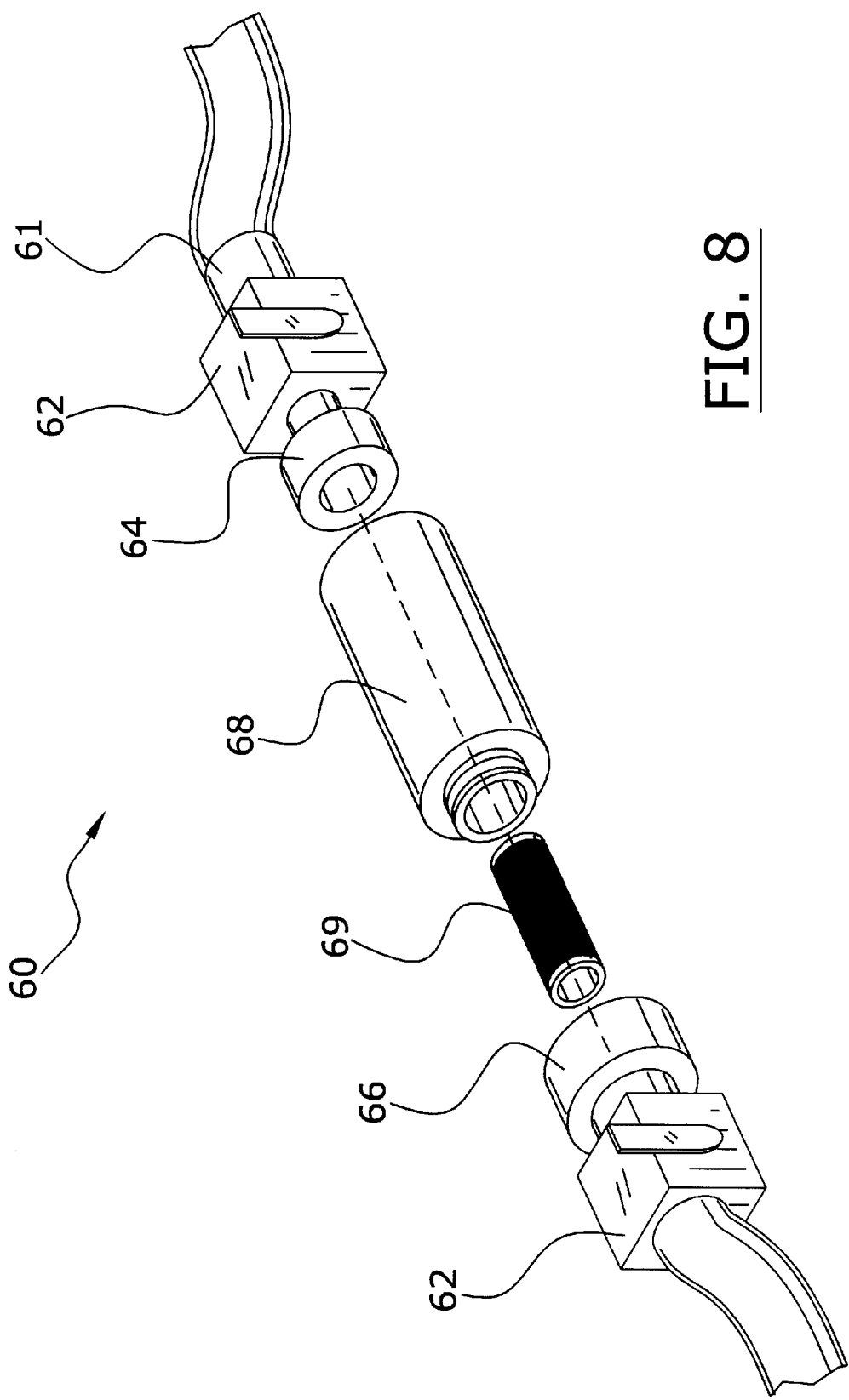
FIG. 8 is an upper perspective view of a replaceable filter system that utilizes a pair of opposing quick releases to provide easy access thereto.
Figure 9A:
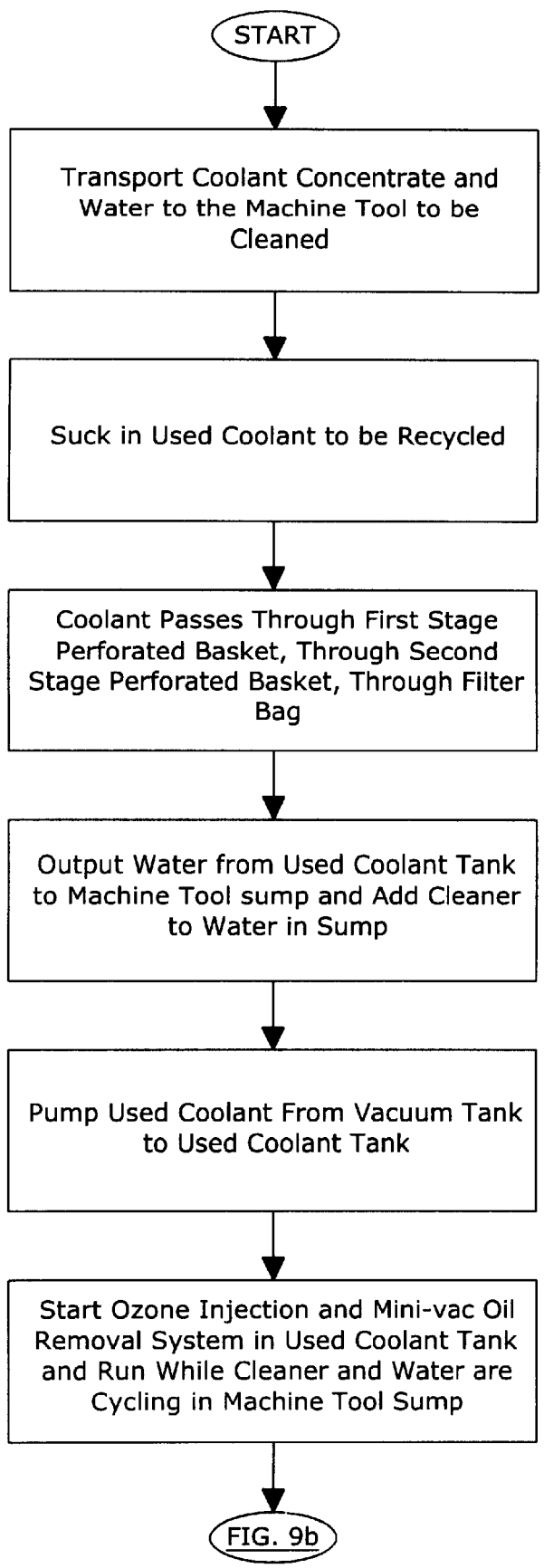
FIGS. 9a and 9b are flowcharts illustrating the basic overall operation of the present invention although variations for particular circumstances may also be utilized.
Figure 9B:
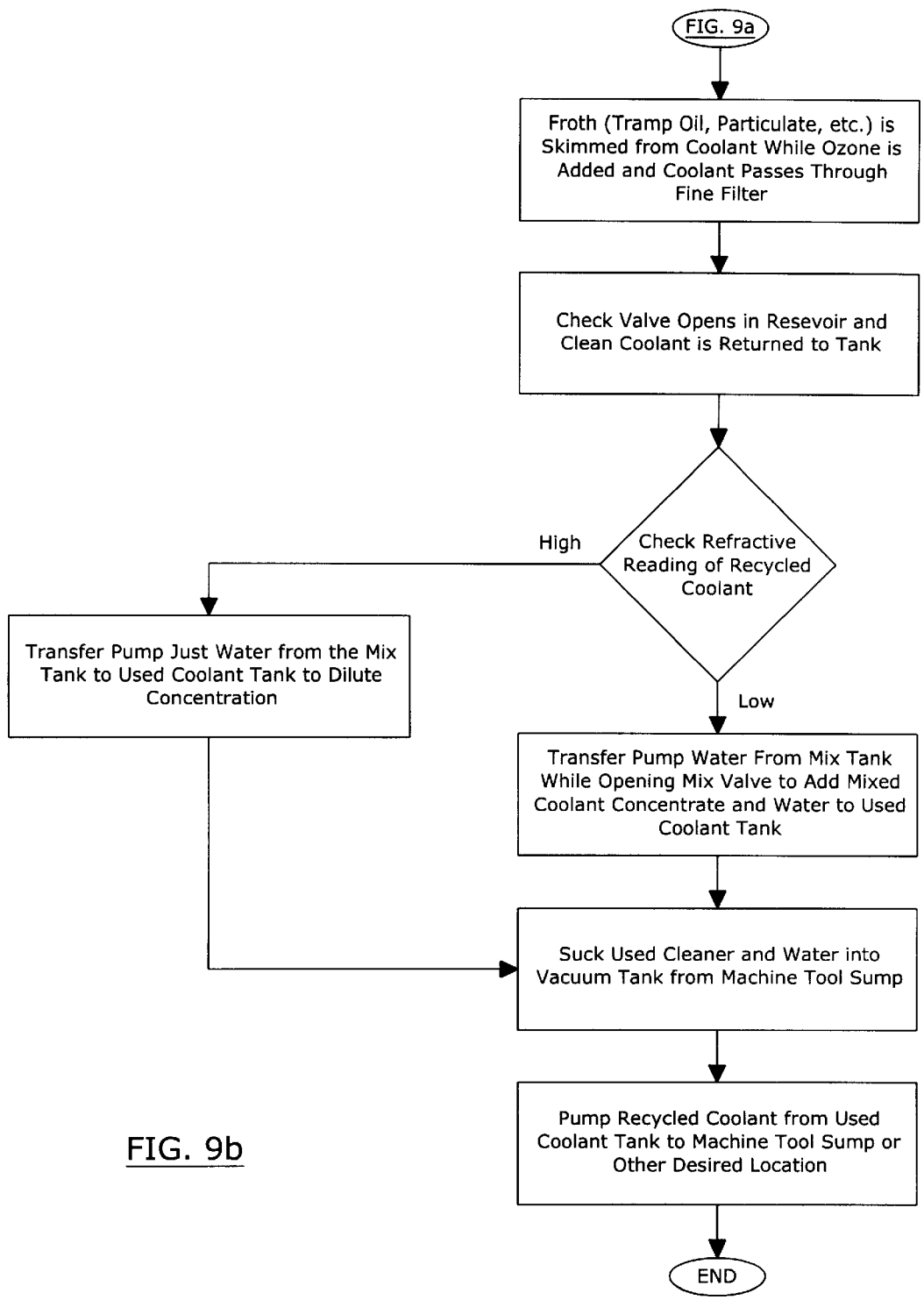

An unnumbered tube is fluidly connected to the first tank 20 to transport the coolant to the third tank 40 as shown in FIG. 1 of the drawings. An inline filter 60 is preferably utilized within the unnumbered tube for further cleaning the coolant prior to entry into the third tank 40. The inline filter 60 is preferably removably attached within the unnumbered tube for allowing easy and simple cleaning of the inline filter 60. As shown in FIG. 8 of the drawings, the inline filter 60 is preferably comprised of a pair of isolating valves 62, a check valve 61, a first quick release 64, a second quick release 66, a filter housing 68 connectable within the quick releases 64, 66, and a removably filter 69 removably positionable within the filter housing 68 for allowing replacement or cleaning thereof. The preliminary filtered coolant within the first tank 20 is pumped into the third tank 40 via a conventional pump or similar device.

The second tank 30 is preferably designed to hold a volume of water which is to be mixed with the coolant concentrate within the second tank 30. The second tank 30 preferably also has a sub-tank within that contains a volume of coolant concentrate that is to be mixed within the second tank 30 to assist in the recycling of the coolant within the third tank 40.

Ozone is preferably added within the coolant within the third tank 40 via an ozone applicator 100 that utilizes a venturi effect within a mixing tube 102 wherein the ozone is provided by an ozone tube 104 by an ozone generator 120. The ozone kills mold, yeast, fungus and bacteria while also changing the physical state of some dissolved solids for increasing the ability to remove the contaminants from the coolant. For example, the ozone mixed within the coolant will convert dissolved rust into iron which can be removed with a conventional filter.

Figure 2:
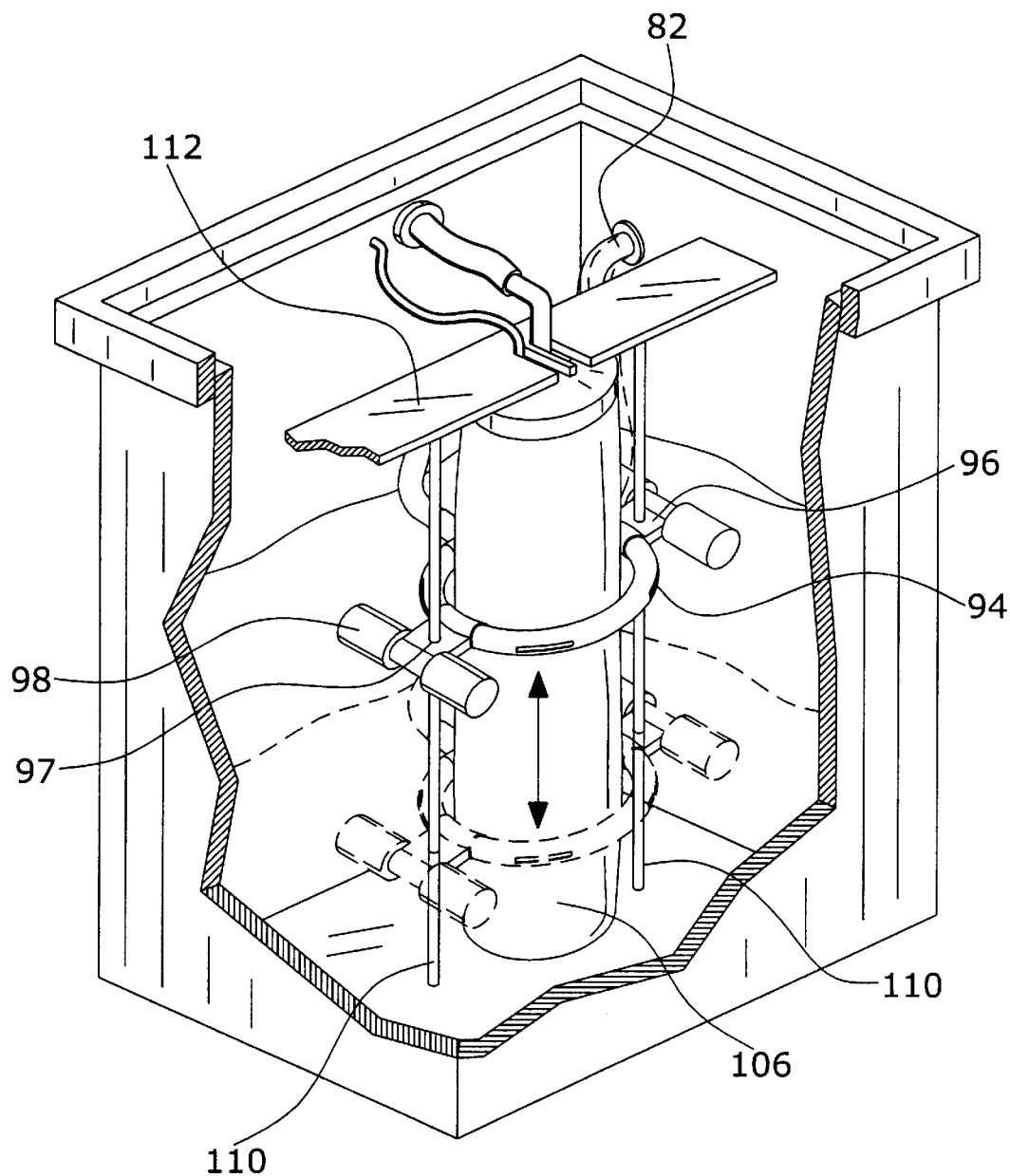
FIG. 2 is an upper perspective cutaway view of the third tank disclosing the skimming apparatus.
Figure 3:
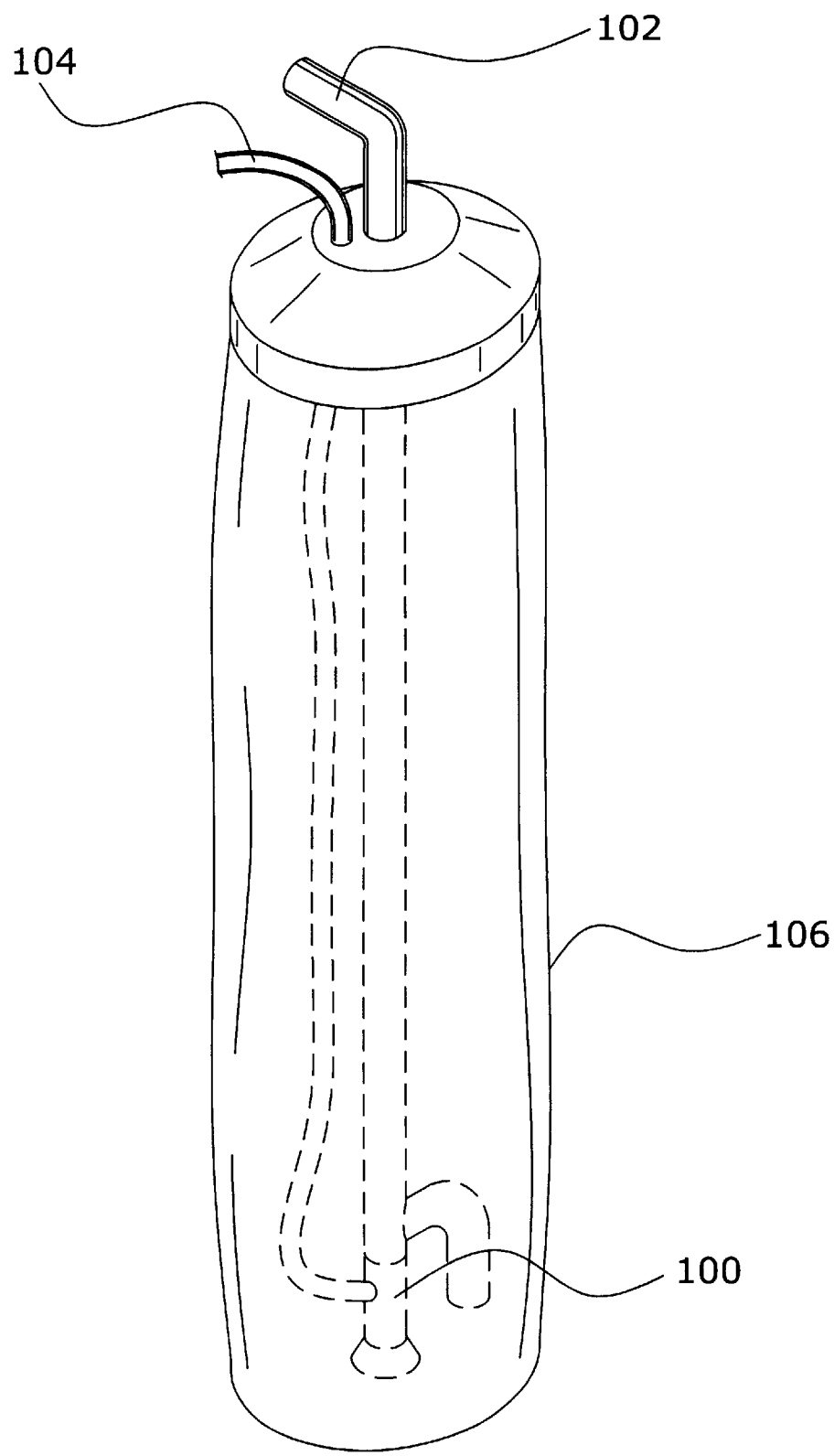
FIG. 3 is an upper perspective view of the ozone applicator.
Figure 4:
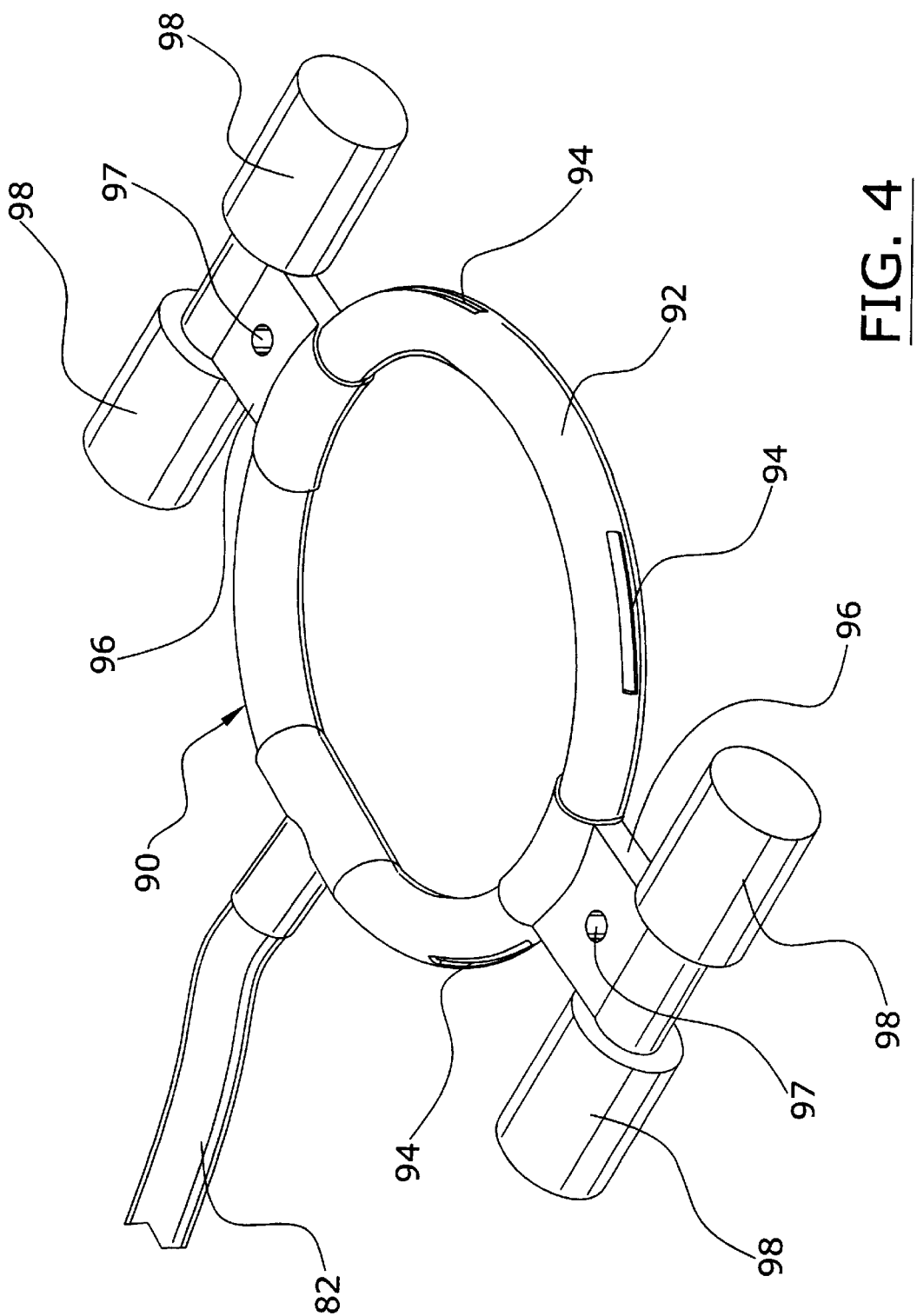
FIG. 4 is an upper perspective view of the skimmer apparatus.
Figure 5:
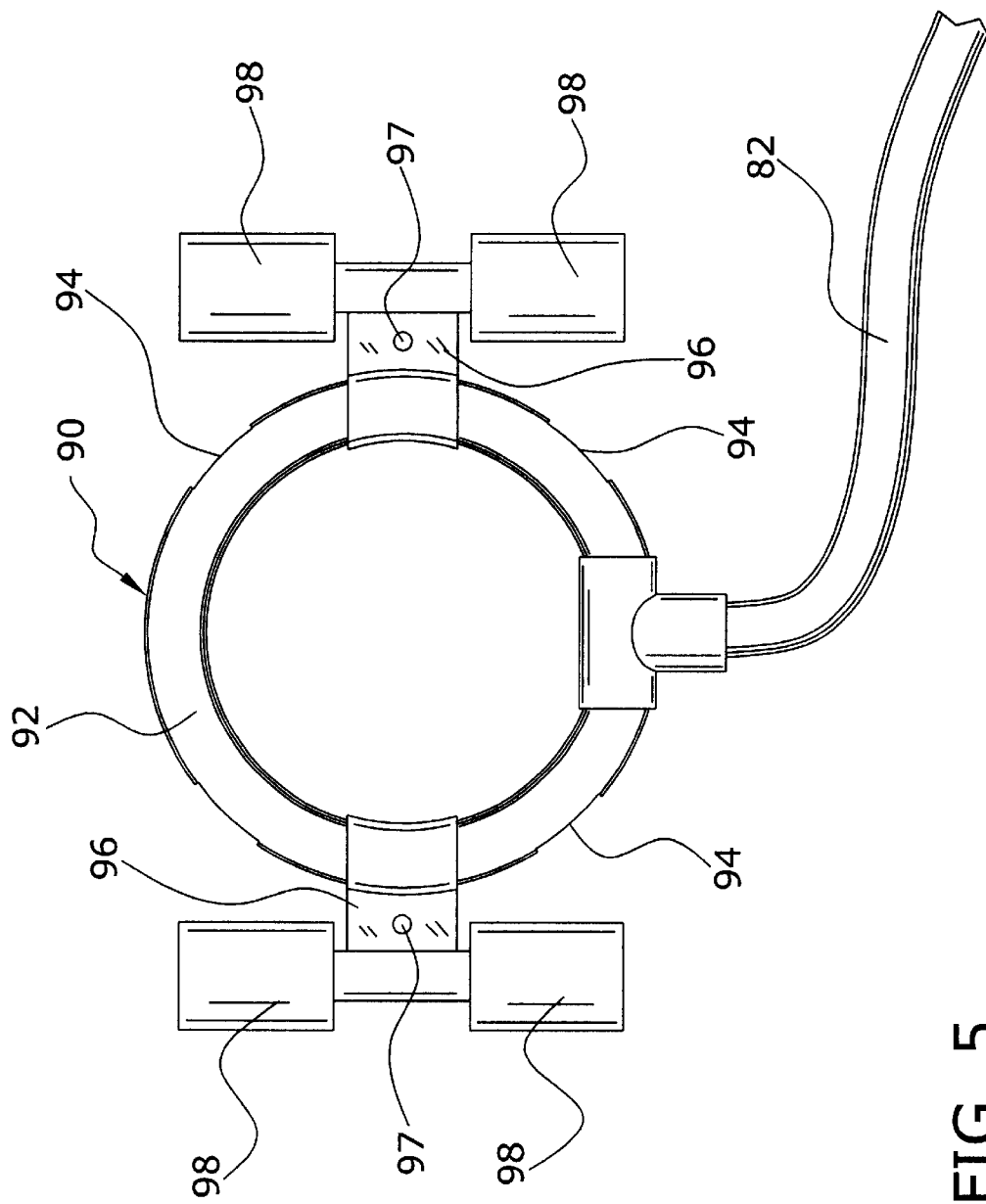
FIG. 5 is a top view of the skimmer apparatus.

During the circulating of the coolant within the third tank 40 with the dissolved air and the ozone, a "froth" of contaminates is created which floats to the upper surface of the volume of the coolant within the third tank 40. A skimmer apparatus 90 is utilized to extract the upper portion of the coolant and the froth as shown in FIG. 2 of the drawings. More specifically, the skimmer apparatus 90 is comprised of a tubular ring member 92 that movably surrounds the ozone applicator 100 as shown in FIG. 2 of the drawings. A plurality of openings 94 within the tubular ring member 92 draw the froth and upper portion of the coolant into the ring member 92 and then into a skimmer hose 82 which is fluidly connected to a housing with a second vacuum 80 having a vacuum unit 86. A pair of opposing brackets 96 are attached to the tubular ring member 92 for supporting a plurality of buoys 98 which support the skimmer apparatus 90 upon the upper portion of the coolant within the third tank 40. The buoys 98 may be comprised of any buoyant structure capable of supporting the skimmer apparatus 90 at the desired upper level of the coolant within the third tank 40. As further shown in FIGS. 2, 4 and 5 of the drawings, a pair of apertures 97 extend through the brackets 96 that slidably receive a corresponding pair of support rods 110 secured within the third tank 40 via the floor and an upper member 112 preferably though various other connections may be utilized.

Figure 6:
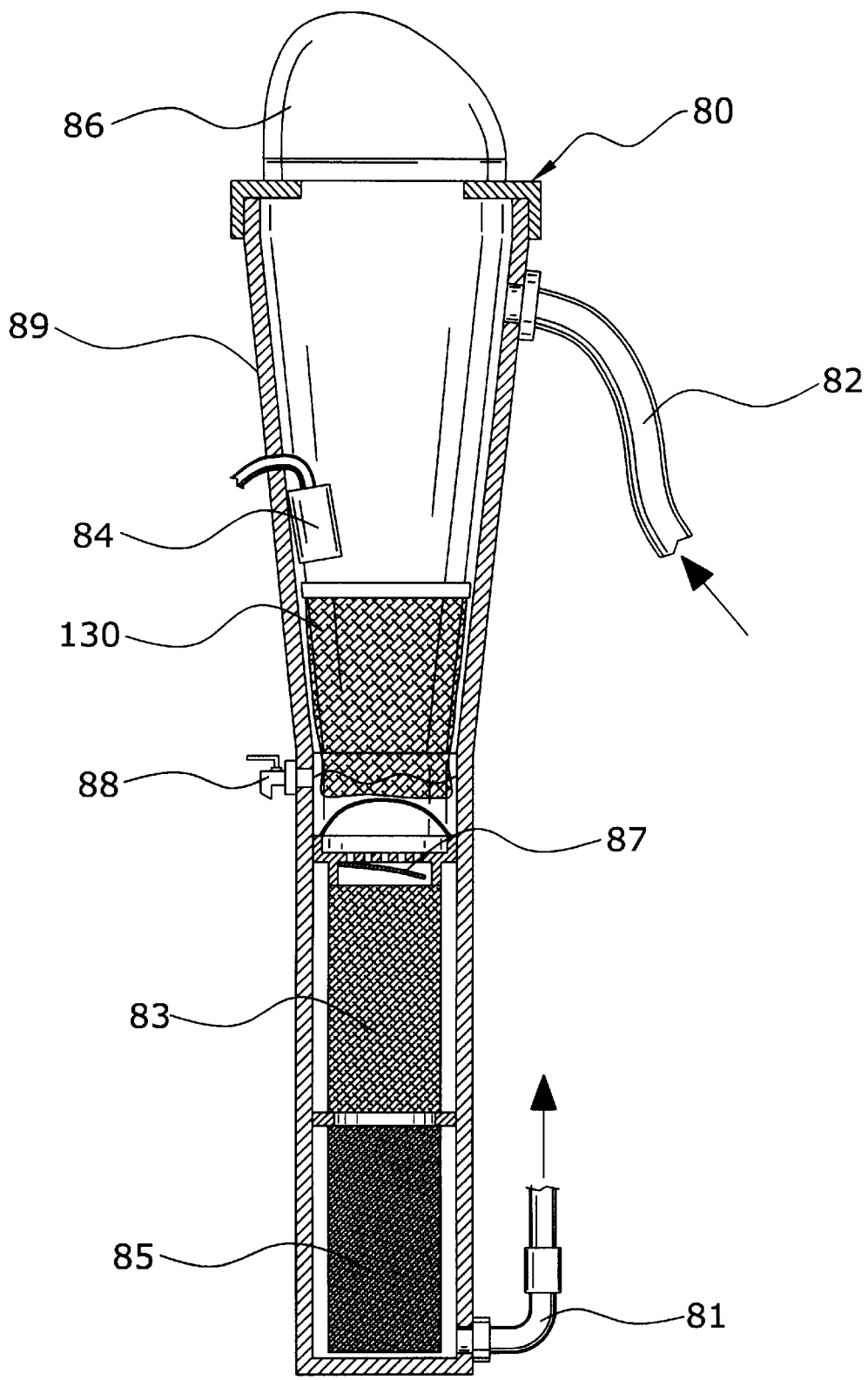
FIG. 6 is a side cutaway view of the skimmer filtration system.
Figure 7:
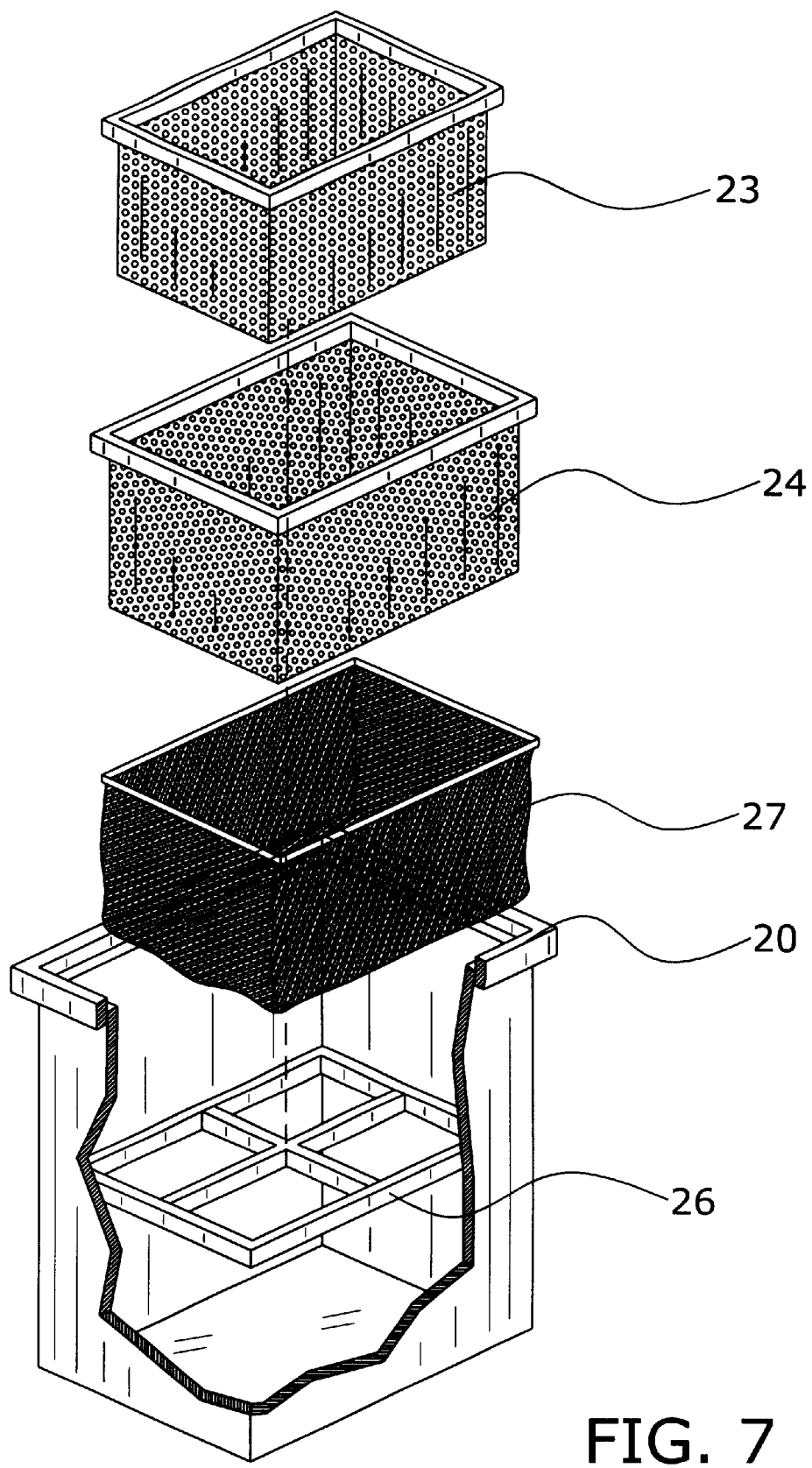
FIG. 7 is an upper perspective cutaway view of the first tank illustrating the perforated baskets and the thermoplastic bag.

The froth and the upper portion of the coolant within the third tank 40 are drawn into the skimmer hose 82 by the second vacuum 80 or a pump structure into a reservoir 89 for selective filtration as shown in FIG. 6 of the drawings. The reservoir 89 preferably includes a first filter 130, a second filter 83, a reusable hydrocarbon attracting polymer, and a third filter 85 positioned in a stacked manner even though more or less filters may be utilized within the reservoir 89. A check valve 87 comprised of a resilient flap member is preferably positioned above the filters 83, 85 within the reservoir 89 to close when the vacuum is energized so as not to remix contaminates with the clean coolant below. Another very important function of this check valve is to trap a very large percentage of lighter tramp oils in reservoir 89 so only a small amount is left for the filters below to process, as best illustrated in FIG. 6 of the drawings. The froth and upper portion of the coolant is drawn into the interior portion of the reservoir 89 until this fluid (mostly tramp oils, particulate and some coolant) raises the float switch 84 high enough to shut off the vacuum 86. When the vacuum de-energizes the check valve 87 opens and allows the coolant to slowly gravity feed downwardly through filters 130, 83, 85, through output hose 81 back into tank 40 in a clean state where it is combined with the coolant. As the float switch 84 drops far enough, the vacuum 80 is re-energized and more floating contaminates are processed. The process is usually complete in two to five automatic cycles at which point coolant in tank 40 is clean. When this process is complete the operator opens side valve 88 within the reservoir 89 to allow the froth (tramp oils, particulate, etc.) to escape from within reservoir 89.

It can be appreciated that various other conventional filtering means and devices may be utilized within the third tank 40 to achieve various filtering effects for recycling the coolant. A bag filter 106 may also be utilized surrounding the ozone applicator 100 to further enhance cleaning of the coolant. Furthermore, it can be appreciated that the second tank 30 may dispense fresh coolant into the third tank 40 to be mixed with the cleaned coolant thereby "recharging" the coolant prior to dispensing back to the machine tool through an outlet hose 42 or similar structure.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

| Index of Elements for Coolant Recycling System |
|---|

- ENVIRONMENTAL ELEMENTS
- 
- 
- 
- 
- 
- 
- 
- 
- 
- 10. Coolant Recycling System
- 11.
- 12.
- 13.
- 14.
- 15.
- 16.
- 17.
- 18.
- 19.
- 20. First Tank
- 21.
- 22. Inlet Hose
- 23. First Perforated Basket
- 24. Second Perforated Basket
- 25.
- 26. Bag Support
- 27. Filter Bag
- 28.
- 29.
- 30. Second Tank
- 31.
- 32.
- 33.
- 34.
- 35.
- 36.
- 37.
- 38.
- 39.
- 40. Third Tank
- 41.
- 42. Outlet Hose
- 43.
- 44.
- 45.
- 46.
- 47.
- 48.
- 49.
- 50. First Vacuum
- 51.
- 52.
- 53.
- 54.
- 55.
- 56.
- 57.
- 58.
- 59.
- 60. Inline Filter
- 61. Check Valve
- 62. Isolating Valves
- 63.
- 64. First Quick Release
- 65.
- 66. Second Quick Release
- 67.
- 68. Filter Housing
- 69. Filter
- 70. Frame
- 71.
- 72. Vertical Members
- 73.
- 74. Wheels
- 75.
- 76. Horizontal Members
- 77.
- 78. Extended Portion
- 79.

- 80. Second Vacuum
- 81. Output Hose
- 82. Skimmer Hose
- 83. First Filter
- 84. Level Detector
- 85. Second Filter
- 86. Vacuum Unit
- 87. Check Valve
- 88. Side Valve
- 89. Reservoir

- 90. Skimmer Apparatus
- 91.
- 92. Ring Member
- 93.
- 94. Openings
- 95.
- 96. Brackets
- 97. Apertures
- 98. Buoys
- 99.

- 100. Ozone Applicator
- 101.
- 102. Mixing Tube
- 103.
- 104. Ozone Tube
- 105.
- 106.
- 107.
- 108.
- 109.

- 110. Support Rods
- 111.
- 112. Upper Member
- 113.
- 114.
- 115.
- 116.
- 117.
- 118.
- 119.

- 120. Ozone Generator

- 130. Fine Particulate Filter

I claim:

1. A coolant recycling system, comprising:
   a receiving tank for receiving a volume of contaminated coolant;
   a cleaning tank fluidly connected to said receiving tank for mixing said contaminated coolant with a volume of coolant concentrate;
   an ozone applicator positioned within said cleaning tank for applying a volume of ozone within said contaminated coolant;
   a means for circulating said contaminated coolant within said cleaning tank;
   a skimmer apparatus for removing an upper portion of said contaminated coolant wherein said skimmer apparatus is comprised of:
   a reservoir positioned adjacent said cleaning tank and having a filtration means disposed therein and a pump means disposed thereon said reservoir having an upper portion and a lower portion wherein said reservoir is fluidly connected to said cleaning tank by a first hose attached to said reservoir lower portion for returning cleaned coolant to said cleaning tank;
   a ring member positioned within said cleaning tank and floating upon an upper surface of said contaminated coolant said ring member being fluidly connected to said reservoir by a second hose attached to said reservoir upper portion;
   a plurality of openings within said ring member for drawing said upper portion of said contaminated coolant into said ring member and said second hose; and
   a plurality of buoys attached to said ring member for supporting said ring member upon said upper surface of said contaminated coolant.

2. The coolant recycling system of claim 1, wherein said plurality of buoys are attached to a plurality of brackets attached to said ring member.

3. The coolant recycling system of claim 1, wherein said openings within said ring member are within an outer portion of said ring member.

4. The coolant recycling system of claim 1, wherein said ring member has a circular shape.

5. The coolant recycling system of claim 1, wherein said ring member is movably positioned about said ozone applicator to adjust to a fluid level of said contaminated coolant.

6. The coolant recycling system of claim 1, wherein said skimmer apparatus further includes a pair of support rods secured in a vertical manner within said cleaning tank and a pair of apertures within a plurality of brackets for slidably receiving said pair of support rods.

7. The coolant recycling system of claim 1, wherein said filtration means of said reservoir is comprised of a first filter and a second filter stacked upon one another.

8. The coolant recycling system of claim 7, wherein said filtration means further includes a check valve positioned above said first filter and said second filter for closing upon energizing of said pump means thereby preventing mixing of contaminants with clean coolant below.

9. The coolant recycling system of claim 8, wherein said filtration means further includes a side valve positioned above said check valve for allowing the release of accumulated contaminants within said reservoir.

10. The coolant recycling system of claim 1, including a float switch within said reservoir in communication with a vacuum unit of said reservoir for detecting a fluid level within said reservoir and controlling said vacuum unit thereby.

11. The coolant recycling system of claim 1, including perforated baskets positioned within said receiving tank for removing particulate matter from said contaminated coolant.

12. The coolant recycling system of claim 1, including a bag support secured within said receiving tank for supporting a filter bag.

13. The coolant recycling system of claim 1, including an inline filter within a fluid connection between said receiving tank and said cleaning tank.

14. The coolant recycling system of claim 1, wherein said ozone applicator utilizes a venturi effect to insert ozone into said contaminated coolant.

15. The coolant recycling system of claim 1, including said cleaning tank being fluidly connected to a recycling tank for storing a volume of recharging solution.

16. The coolant recycling system of claim 15, wherein said receiving tank, said cleaning tank and said recycling tank are comprised of an integral structure.

* * * * *